United States Patent [19]

Congdon

[11] Patent Number: 4,796,945
[45] Date of Patent: Jan. 10, 1989

[54] AGRICULTURAL WAGON PROTECTIVE COVER

[76] Inventor: Danny D. Congdon, 73 Evergreen St., Cortland, N.Y. 13045

[21] Appl. No.: 80,797

[22] Filed: Aug. 3, 1987

[51] Int. Cl.$^4$ ................................................. B60P 7/02
[52] U.S. Cl. ........................................ 296/100; 49/14; 49/371; 105/377
[58] Field of Search ................... 296/100, 101; 49/371, 49/169, 13, 14; 105/377

[56] References Cited

U.S. PATENT DOCUMENTS

| | | | |
|---|---|---|---|
| 2,949,867 | 8/1960 | Ramsey | 105/377 |
| 4,239,008 | 12/1980 | Conlon | 105/377 |
| 4,275,662 | 6/1981 | Adler et al. | 105/377 |
| 4,368,674 | 1/1983 | Wiens et al. | 105/377 |
| 4,435,010 | 3/1984 | Mandel | 296/100 |

*Primary Examiner*—Robert R. Song
*Attorney, Agent, or Firm*—Leon Gilden

[57] ABSTRACT

An agricultural wagon protective cover as set forth formed of relatively rigid material such as reinforced fiber glass. The invention maintains its geometric integrity throughout its working environment. Formed with a single open hatch or alternatively of plural hatches, my cover enables filling of a single or compartmentalized agricultural wagon. A catwalk is provided for accessibility to the covers and access to the interior of said wagon. Optional limit switches are provided to enable indication of complete closure of the pivoting individual or several hatches.

8 Claims, 1 Drawing Sheet

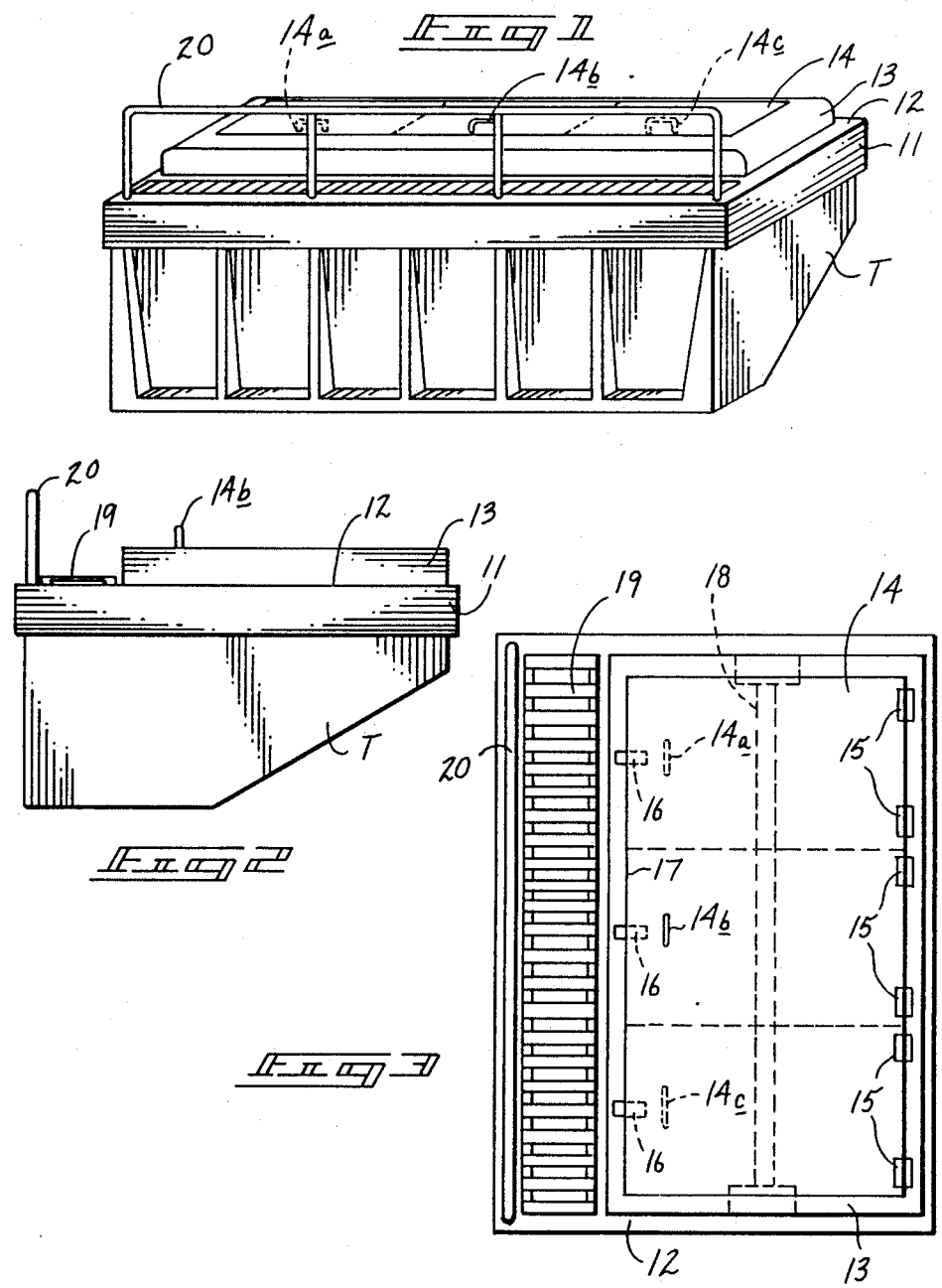

AGRICULTURAL WAGON PROTECTIVE COVER

BACKGROUND OF THE INVENTION

1. Field of the Invention

The present invention relates to agricultural wagon covers and more particularly to new and improved agricultural wagon cover including a single or plurality of covers that may be used selectively or collectively for deposit of agricultural product within said wagon. The invention further includes a catwalk formed along a perimeter of my cover including a safety guard rail. Optional limit switches are available for indication of complete closure of the cover to insure protection of an agricultural wagon's contents.

2. Description of the Prior Art

The use of agricultural wagon protective covers has been well known in the art. As may be appreciated, these devices have typically been formed of a flexible fabric-like material requiring various complex skeleton-like framework to support such material wherein the opening and closing of the cover for exposure of the wagon interior has been a relatively tedious and time consuming expenditure of valuable man hours. Furthermore, complex and awkward hold-down straps and latches have required further expenditure of time to manipulate these various securement devices. Accordingly due to ill fitting and weathering of such material and unnecessary complexity associated therewith, agricultural spoilage and loss of product has plagued the agricultural industry.

Examples of prior devices include U.S. Pat. No. 3,913,969 to Hoch setting forth the use of a rigid truck body cover requiring the use of hydraulic lifting means secured to the truck body cover to pivotally open said cover and expose the contents of the wagon. Limited opening of said cover prevents use of such a device in field application when utilized in conjunction with such filling apparatus as combined.

U.S. Pat. No. 3,951,447 to Sharp sets forth a further rigid cover securable to a trailer with a plurality of flexible rope-like members to secure the cover in place.

U.S Pat. No. 4,124,247 to Penner sets forth a pivoting truck bed cover normally held open by wound spring members to position a cover in an open position while loading the truck body. Application of this particular apparatus to agricultural endeavor is limited due to the relatively awkward opening relationship of said cover means to the truck bed.

U.S. Pat. No. 4,142,760 to Dockery, et al., sets forth another example of a truck bed cover of relatively similar relationship to that of Penner, however the pivoting means is positioned and secured to a longitudinal side of the truck bed rather than to an end portion thereof.

U.S. Pat. Nos. 4,324,429 to Wilson and 4,420,181 to Hallburg are further refinements of the Penner style pick up bed pivoting cover arrangement with the attendant limitations when application to agricultural vehicles is attempted.

U.S. Pat. No. 4,493,601 to Hill sets forth a receiving container utilized with a crop transport vehicle including a shiftable top that may be repositioned for over-the-road travel. This particular arrangement is again limiting for use in agricultural work environments where trailers are conventionally filled from the top.

SUMMARY OF THE INVENTION

In view of the foregoing disadvantages inherent in the known types of agricultural wagon protective covers now present in the prior art, the present invention provides an improved agricultural wagon protective cover. As such, the general purpose of the present invention, which will be described subsequently in greater detail, is to provide a new and improved agricultural wagon protective cover which has all the advantages of the prior art covers and none of the disadvantages.

To attain this, the present invention comprises a relatively rigid cover formed of a relatively rigid material such as reinforced fiber glass to maintain a pre-selected geometric configuration even when subjected to adverse working or climactic conditions. Hatch-like openings are provided for selective filling of a compartmentalized wagon or alternatively a single hatch configuration may be utilized. A catwalk is positioned along a perimeter of my invention enabling a user relative ease of access to the cover or hatch portion for attention to malfunction of a farm implement or improper loading of a trailer associated with my invention A guard rail is positioned relative to the catwalk for user safety purposes. Optional limit switches are provided to alert an operator to an improper closure of the aforenoted hatch means.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved agricultural wagon protective cover which has all the advantages of the prior art and none of the disadvantages.

It is another object of the present invention to provide a new and improved agricultural wagon protective cover which may be easily and efficiently manufactured and marketed.

It is a further object of the present invention to provide a new and improved agricultural wagon protective cover which is of a durable and reliable construction.

An even further object of the present invention is to provide a new and improved agricultural wagon protective cover which is susceptible of a low cost of manufacture with regard to both materials and labor, and which accordingly is then susceptible of low prices of sale to the consuming public, thereby making such agricultural wagon protective covers economically available to the buying public.

Still yet another object of the present invention is to provide a new and improved agricultural wagon protective cover which provides in the apparatuses and methods of the prior art some of the advantages thereof, while simultaneously overcoming some of the disadvantages normally associated therewith.

Still another object of the present invention is to provide a new and improved agricultural wagon protective cover utilizing a single pivoting hatch member or alternatively a plurality of hatch members for selective filling of a compartmentalized agricultural wagon.

Yet another object of the present invention is for a new and improved agricultural wagon protective cover formed with a perimeter positioned catwalk enabling access to the cover.

Even still another object of the present invention is to provide a new and improved agricultural wagon protective cover with a guard rail positioned at a perimeter of said cover to provide a measure of safety for a user thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric side view of my agricultural wagon protective cover as positioned in use on a typical agricultural wagon.

FIG. 2 is an orthographic end view of my agricultural wagon protective cover.

FIG. 3 is an orthographic top view of my agricultural wagon protective cover.

DESCRIPTION OF THE PREFERRED EMBODIMENT

With reference now to the drawings, and in particular to FIG. 1 thereof, a new and improved agricultural wagon protective cover embodying the principles and concepts of the present invention and generally designated by the reference numeral 10 will be described.

More specifically it will be noted that the agricultural wagon protective cover 10 essentially comprises a perimeter flange 11 positioned orthogonally to a planar top surface 12 to provide an interfitting relatively secure fit to a conventional agricultural trailer "T". A raised hatch assembly portion 13 is elevated somewhat above surface 12 and positioned within said medial portion of said assembly portion 13 is a pivoting hatch cover 14. Said hatch cover 14 is conventionally formed as a single pivoting member to expose the interior volume of trailer "T" to a conventional agricultural grain filling implement such as that associated with a harvesting combine.

At times it may be desirable and necessary to form pivoting hatch cover 14 as a plurality of covers indicated as 14a, 14b, and 14c. The plural hatch cover arrangement may become necessary when associated with an agricultural wagon with discrete compartments for loading of various grain or harvest products and separation of such products is desirable within said trailer "T". Hinge elements 15 are positioned rearwardly of said hatch cover portion along a lengthwise dimension of said hatch assembly portion 13.

Of optional use is a series of limit switches 16 associated with the inner surfaces 17 of said hatch cover 14. Use of limit switches is desirable to alert a user of my invention of a malfitting hatch cover created by an overfilling situation associated with trailer "T" or some other mechanical malfunction that may occur in the use of such devices. It is necessary for hatch cover 14 to be securely closed during over-the-road travels of trailer "T" preventing foreign debris from entering said trailer and further preventing loss of product from within. Further, raised hatch 13 tends to prevent contamination of limit switches 16 by trailer "T" contents in spacing said switches above said contents.

As illustrated in phantom line in FIG. 3, a brace element 18 is positioned longitudinally of agricultural wagon protective cover 10 to assist in prevention of damage to hatch cover 14 when accidental subjection to shock loads to hatch cover 14 in an agricultural industrial environment.

Positioned at a longitudinal perimeter of my invention is a catwalk 19 formed of a ribbed or frictionally surfaced area to enable a user of my invention ready access to the top planar surface 12 and to hatch cover 14. This access becomes necessary for attention in a filling operation normally associated with my invention. A guard rail 20 is further utilized to add a further measure of safety to a user gaining access to the top surface 12. Guard rail 20 may be detachable by means (not shown) of conventional construction to enable removal of guard rail 20 from surface 12 should it effect an interfering relationship with filling devices associated in agricultural usage.

As to the manner of usage and operation of the present invention, the same should be apparent from the above description. Accordingly no further discussion relative to the manner or usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved agricultural wagon protective cover for use with a load carrying vehicle comprising a substantially planar surface; and a continuous flange means depending downwardly from said planar surface for forming an interfitting relationship with said load carrying vehicle, and a hatch means depending upwardly of and integrally secured to said planar surface for enabling access through said protective cover including a pivoting hatch portion wherein said hatch portion comprising at least one pivoting hatch, and a longitudinal brace positioned medially of said hatch means to brace said hatch portion and provide support thereto.

2. A new and improved agricultural wagon protective cover as set forth in claim 1 wherein said hatch means comprises an elevated portion rising above said planar surface with said pivoting hatch portion positioned medially thereof.

3. A new and improved agricultural wagon protective cover as set forth in claim 2 wherein said pivoting hatch portion includes a plurality of individual pivoting hatches.

4. A new and improved agricultural wagon protective cover as set forth in claim 1 wherein said hatch means and said pivoting hatch portion includes limit switches positioned for indicating complete securement of said pivoting hatch portion relative to said hatch means.

5. A new and improved agricultural wagon protective cover as set forth in claim 1 including a catwalk portion positioned adjacent a longitudinal perimeter of said agricultural wagon protective cover.

6. A new and improved agricultural wagon protective cover as set forth in claim 5 wherein a guard rail removably secured to said planar surface cooperates with said catwalk for enabling a grasping portion for a user of said catwalk.

7. A new and improved agricultural wagon protective cover as set forth in claim 1 wherein said hatch portion is pivotally secured to said hatch means along a longitudinal portion thereof by means of hinge elements.

8. A new and improved agricultural wagon protective cover as set forth in claim 5 wherein said catwalk includes a roughened friction surface for non-slip engagement thereof by a user.

* * * * *